United States Patent
Kabata et al.

(10) Patent No.: US 8,941,281 B2
(45) Date of Patent: Jan. 27, 2015

(54) ROTATING ELECTRICAL MACHINE AND STATOR THEREOF

(75) Inventors: Yasuo Kabata, Kanagawa (JP); Masafumi Fujita, Kanagawa (JP); Koji Matsuyama, Kanagawa (JP); Yuuichiro Gunji, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 923 days.

(21) Appl. No.: 13/111,225

(22) Filed: May 19, 2011

(65) Prior Publication Data
US 2011/0215661 A1 Sep. 8, 2011

Related U.S. Application Data

(63) Continuation-in-part of application No. PCT/JP2009/006397, filed on Nov. 26, 2009.

(30) Foreign Application Priority Data

Nov. 27, 2008 (JP) ................ 2008-301924

(51) Int. Cl.
*H02K 1/20* (2006.01)
*H02K 9/06* (2006.01)
*H02K 1/16* (2006.01)
*H02K 3/487* (2006.01)

(52) U.S. Cl.
CPC .. *H02K 1/20* (2013.01); *H02K 1/16* (2013.01); *H02K 3/487* (2013.01)
USPC .................. 310/214; 310/58; 310/59; 310/65

(58) Field of Classification Search
None
See application file for complete search history.

(56) References Cited

U.S. PATENT DOCUMENTS

| | | | | |
|---|---|---|---|---|
| 4,061,937 A | * | 12/1977 | Goel et al. | 310/65 |
| 6,124,659 A | * | 9/2000 | Rowe et al. | 310/214 |
| 6,504,274 B2 | * | 1/2003 | Bunker et al. | 310/64 |
| 2002/0084703 A1 | | 7/2002 | Bunker et al. | |
| 2008/0169710 A1 | * | 7/2008 | Hattori et al. | 310/53 |

FOREIGN PATENT DOCUMENTS

| | | |
|---|---|---|
| DE | 44 22 543 A1 | 1/1996 |
| EP | 0 690 543 A1 | 1/1996 |
| JP | 54-011481 B2 | 5/1979 |
| JP | 58-127835 U | 8/1983 |
| JP | 08-019197 A | 1/1996 |

(Continued)

OTHER PUBLICATIONS

Translation of International Preliminary Report on Patentability of PCT/JP2009/006397, dated Jul. 14, 2011, 7 pages.

*Primary Examiner* — Tran Nguyen
(74) *Attorney, Agent, or Firm* — Foley & Lardner LLP

(57) ABSTRACT

According to an embodiment, radially extending inner spacers are provided in a stator core at a distance from each other in the circumferential direction at intervals between a prescribed number of stacked magnetic steel plates, and ventilation ducts for cooling gas flow are formed in the radial direction. The perimeter of each ventilation duct is defined by the inner spacers and a magnetic steel plate separated by the inner spacers. The cooling gas, which flows in the rotation direction, is split laterally to both sides of a rotor coil and directed toward the outer circumference. Portions of the shoulder parts of a wedge are cut off such that the width of the shoulder parts of the wedge at positions corresponding to the ventilation ducts matches the slot width.

13 Claims, 11 Drawing Sheets

(56) References Cited

FOREIGN PATENT DOCUMENTS

| | | |
|---|---|---|
| JP | 11-332142 A | 11/1999 |
| JP | 2002-272059 A | 9/2002 |
| JP | 2003-158841 A | 5/2003 |
| JP | 2008-172968 A | 7/2008 |

* cited by examiner

ROTATION DIRECTION OF THE ROTOR

ROTATION DIRECTION OF THE ROTOR

ROTATION DIRECTION OF THE ROTOR

ROTATION DIRECTION OF THE ROTOR

ROTATION DIRECTION OF THE ROTOR

ROTATION DIRECTION
OF THE ROTOR

ROTATION DIRECTION OF THE ROTOR

ROTATION DIRECTION OF THE ROTOR

ROTATION DIRECTION OF THE ROTOR

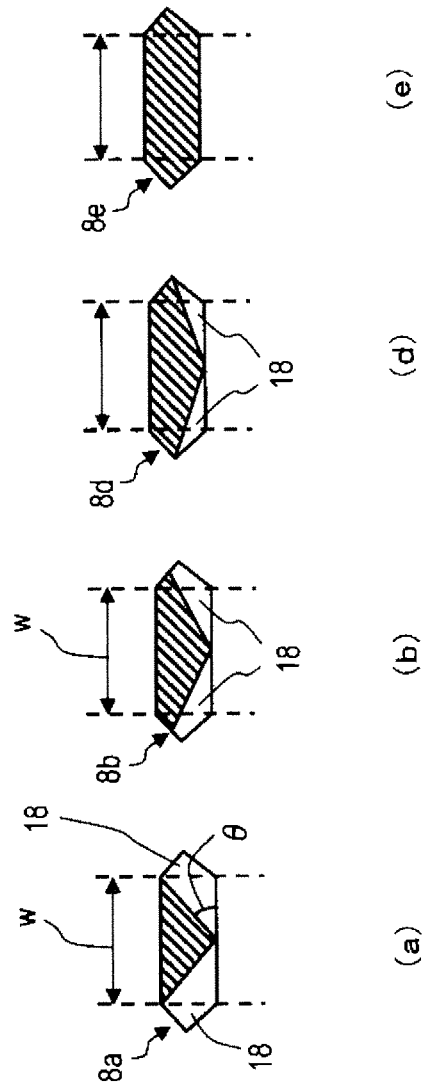

ROTATING ELECTRICAL MACHINE AND STATOR THEREOF

CROSS-REFERENCE TO RELATED APPLICATION

This application is a continuation-in-part (CIP) application based upon the International Application PCT/JP2009/006397, the International Filing Date of which is Nov. 26, 2009, the entire content of which is incorporated herein by reference, and this application is based upon and claims the benefit of priority from Japanese Patent Application No. 2008-301924, filed on Nov. 27, 2008, the entire content of which is incorporated herein by reference.

FIELD

Embodiments described herein relates to a rotating electric machine having a stator core made up of stacked electromagnetic steel plates and a stator thereof and particularly to a stator of a rotating electric machine that is aimed at improving the ventilating and cooling performance of a stator core and stator coils that are contained in slots of the stator core.

BACKGROUND

A conventional stator of a rotating electric machine will be described with reference to FIGS. 14 to 18.

FIG. 14 is a longitudinal cross-sectional view of an upper half portion of a stator core and a rotor of a rotating electric machine. FIG. 15 is a transverse cross-sectional view of FIG. 14, schematically showing a flow of cooling gas at a ventilation duct portion.

As shown in FIGS. 14 and 15, the stator of the rotating electric machine includes a cylindrical stator core 1, which is made up of a plurality of electromagnetic steel plates 2 that are stacked, and stator coils 7, which are contained in slots 6 that are formed at an inner circumference side of the stator core 1. The stator coils 7 latch into the slots 6, held by wedges 8 from the inner circumference side of the stator core 1. The wedges 8 have a shoulder portion that is wider than the width w of the slots 6. The wedges 8 are inserted along grooves that are provided on core tooth portions 9 along an axial direction.

Every time a predetermined number of electromagnetic steel plates 2 are stacked, a ventilation duct 5 is formed to allow cooling gas of the radial direction of the stator core 1 to pass therethrough. A peripheral portion of each of the ventilation ducts 5 is made up of at least one or more first inner spacers 4T, which are inserted between the electromagnetic steel plates 2 of the core tooth portions 9 that form the slots 6 of the stator core 1; at least one or more second inner spacers 4S, which are inserted at stator core outer side positions of the stator coils 7; and the electromagnetic steel plates 2, which are so disposed as to be spaced apart by the inner spacers 4T and 4S. The second inner spacers 4S, which are inserted at the stator core outer side positions of the stator coils 7, extend to stator core outer circumference portions of the slots 6. The first inner spacers 4T extend to inner circumference portions of the core tooth portions 9 of the stator core 1. Therefore, the stacked electromagnetic steel plates 2 are kept bonded together. The stator core 1 is clamped with end flanges, which are not shown in the diagrams, at the both ends of the stator core 1 in the direction of a rotational axis.

When the rotating electric machine having the stator described above is operated, the stator coils 7, among other things, generate heat due to electric current. The stator core 1 also generates heat as eddy current and the like emerge. In order to cool down the above, cooling gas 11 flows into the ventilation ducts 5 to cool the stator coils 7 and the stator core 1.

FIG. 16 is a schematic diagram showing paths the cooling gas takes in the ventilation ducts. As shown in FIG. 16, the stator core 1 includes core blocks 3, which are disposed at predetermined intervals in the axial direction, and the ventilation ducts 5.

The ventilation ducts 5 are divided into two sections: inlet sections 12, in which the cooling gas 11 flows from the outer side of the stator to the inner side; and exhaust sections 13, in which the cooling gas 11 flows from the inner circumference side of the stator to the outer circumference side. The sections 12 and 13 are alternately arranged in the direction of the axis of the core. The cooling gas 11 comes out of fans, which are not shown in the diagram, that are attached to both ends of a rotor 15. The cooling gas 11 is supplied into a gas gap 14, which is a gap between the stator core 1 and the rotor 15, from the outer circumference side of the stator core 1, an inner part of the rotor 15 and an end portion of the stator core. The cooling gas 11 that flows to the outer circumference side of the stator core passes through the ventilation ducts 5 of the inlet sections 12 to cool the core 1 and the stator coils 7 before being discharged into the gas gap 14.

The cooling gas 11 discharged from the inlet sections 12 and the cooling gas 11 that flows into the gas gap 14 directly from the end portion of the stator core are supplied to the ventilation ducts 5 of the exhaust sections 13 after flowing through the gas gap 14 in the axial direction. At this time, the cooling gas 11 discharged from the surface of the rotor after passing through the rotor 15 also flows together in the gas gap 14; and passes through the exhaust sections 13 to cool the stator coils 7 and the stator core 1 before being discharged to the outer circumference side of the stator. After flowing out from the outer circumference side of the stator, the cooling gas 11 is cooled down by a gas cooler, which is not shown in the diagram, and flows back again to the fans provided on the rotor 15.

The flow of the cooling gas 11 in the gas gap 14 is a flow having a certain level of circumferential-direction velocity in the direction of rotation of the rotor because of the flow of the cooling gas that is discharged from the rotor 15 and has a circumferential-direction velocity and of the friction/stirring effect of a surface of the rotor. Meanwhile, stator core inner side end portions 4t of the first inner spacers 4T are so disposed as to extend to tips of the core tooth portions 9 as much as possible, thereby keeping the stacked electromagnetic steel plates 2 bonded together.

Meanwhile, stator core inner side faces 80 of the wedges 8 are set back from inner circumference surfaces 9a of the tooth portions 9 toward the outer side. In stator core inner side openings of the ventilation ducts 5, the inner side end portions 4t of the first inner spacers 4T project toward the inner side of the stator core 1 relative to the inner circumference surfaces 80 of the wedges 8.

With the above configuration, the problems with the exhaust sections 13, in which the cooling gas 11 flows from the inner side of the stator core to the outer side, are for example as follows, as disclosed and pointed out in Japanese Patent Application Laid-Open Publication No. H08-19197 (Patent Document 1).

FIG. 17 is a schematic diagram illustrating the situation where the cooling gas 11 flows in the gas gap 14 around the exhaust section 13 and in the ventilation duct 5. As shown in FIG. 17, the cooling gas 11 that flows in a circumferential direction in the gas gap 14 needs to abruptly change direction at an inlet portion of the ventilation duct 5 so as to travel in the radial direction.

In this case, according to the configuration shown in FIG. 17, the stator core inner side end surface 80 of the wedge 8 is positioned more outer side than the stator core inner side end portion 4t of the first inner spacer 4T. Thus, the cooling gas 11 is more likely to flow into a duct 5b that is positioned on a rotor's rotation direction leading side of the stator coil 7, and it is impossible to obtain a sufficient volume of flow in a duct 5a that is positioned on a delaying side. Therefore, the problem is that it is impossible to obtain sufficient cooling performance.

Moreover, a wedge shoulder portion 16 projects into the ventilation ducts 5a and 5b. Therefore, ventilation areas become smaller and the flow becomes faster abruptly, leading to a rise in friction resistance and causing the ventilation areas to expand and contract abruptly. Therefore, there is a huge ventilation loss.

Another problem is that at a ventilation duct inlet portion of the exhaust section 13, as shown in FIG. 17, stagnant regions 17 appear at a downstream of the wedge shoulder portion 16, causing ventilation resistance to increase.

FIG. 18 is a schematic diagram illustrating the situation where the cooling gas 11 flows in the gas gap 14 around the inlet section 12 and in the ventilation duct 5.

In the inlet section 12, a huge loss (outlet loss) occurs when the cooling gas 11 is discharged into the gas gap 14 after flowing through the ventilation duct 5. According to a conventional structure in which the wedge shoulder portion 16 projects into the ventilation duct 5, ventilation areas become smaller abruptly and the flow of the cooling gas 11 being discharged into the gas gap 14 becomes faster. The increase in outlet loss is proportional to the square of the velocity of the flow. Thus, the problem is that an enormous ventilation loss occurs.

As the ventilation loss of the cooling gas 11 increases, greater power for driving fans is required to drive the cooling gas, resulting in a drop in the efficiency of the rotating electric machine. If it is impossible to obtain sufficient power for driving fans, a flow rate of the cooling gas 11 decreases, and the stator coils 7, the stator core 1, rotor coils and the like cannot be cooled sufficiently, resulting in a decrease in the reliability of the rotating electric machine's operation.

The temperatures of the stator coils 7 of the rotating electric machine are severely restricted by standards. A process of cooling the stator coils 7 plays an important role in realizing a device. In particular, because of increasing demand for power generation in recent years, the current flowing through the stator coils 7 has increased as the per-unit capacity of a power generator has grown. As a result, the amount of heat discharged from the stator coils 7 increases. Therefore, a key technical challenge is to enhance the cooling of the stator coils 7 and reduce the ventilation resistance in order to improve the performance of the rotating electric machine.

By the way, what is disclosed in Japanese Patent Application Laid-Open Publication No. H11-332142 (Patent Document 2) is a technique for adjusting the flow distribution of cooling gas that flows into ventilation ducts of a rotating electric machine in order to uniformize the temperatures of stator windings. Here, the technique disclosed in Patent Document 2 will be described with reference to FIGS. 19 and 20. FIG. 19 is a longitudinal cross-sectional view of an upper half portion of a rotating electric machine disclosed in Patent Document 2 that is positioned around a stator core. FIGS. 20(a), 20(b), 20(d) and 20(e) are diagrams showing the transverse cross-sectional shapes of wedges in portions A, B, D and E of FIG. 19, respectively, in the case of the rotating electric machine of a both-side driving type.

That is, according to the technique disclosed in Patent Document 2, cooling gas flows through a gas gap 14 between a stator core 1 and a rotor 15 in one direction, i.e. in the direction of a rotational axis (from left to right in FIG. 19), and is split flowing into a large number of ventilation ducts 5, which are arranged in an axial direction. A wedge 8 is placed near the inlet of each ventilation duct 5. The wedges 8 extend in the direction of the rotational axis so as to pass through about four to five of core blocks 3 arranged side by side in the direction of the rotational axis. In the entire rotating electric machine, five wedges 8a, 8b, 8c, 8d and 8e are arranged so as to extend in the direction of the rotational axis.

At the positions of the wedges 8 corresponding to the ventilation ducts 5, notch portions 18 are provided. The size and shape of the wedge's notch portions 18 vary appropriately according to the position of the rotational-axis direction. Since the size and shape of each notch portion 18 vary, adjustments are made to the flow distribution of cooling gas flowing into the ventilation ducts 5. That is, the wedge 8a, which is positioned at the axial-direction most upstream side of the flow of the gas gap 14, has the largest notch portions 18 as shown in FIG. 20(a). The notch portions 18 become smaller toward the axial-direction downstream side in the order that the wedges 8b, 8c and 8d are arranged. The wedge 8e, which is positioned at the most downstream side, has no notch portion.

Accordingly, the width of the wedge 8 at a position corresponding to the ventilation duct 5 is substantially equal to the width w of a slot in the case of the wedge 8a. However, the width of the other wedges 8b, 8d and 8e is larger than the width w of the slot, and the wedges 8b, 8d and 8e project into the ventilation ducts 5.

As described above, according to the technique disclosed in Patent Document 2, the size of the notch portion changes depending on the axial-direction position of the wedge. The technique does not necessarily reduce the pressure loss of the flow of the cooling gas.

The present invention has been made in view of the above circumstances. An object of the present invention is to reduce the pressure loss that occurs in the ventilation ducts in the stator core and cool down the stator coils and the stator core in an efficient manner.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which:

FIG. 20 is diagrams showing the transverse cross-sectional shapes of wedges in portions A, B, D and E of FIG. 19, respectively, in the case of a rotating electric machine of a both-side driving type.

DETAILED DESCRIPTION

According to an embodiment, there is provided a stator of a rotating electric machine, the stator including: a cylindrical stator core that is formed by stacking, in an axial direction, electromagnetic steel plates so arranged as to surround outer circumference of a rotor; stator coils that are contained in a plurality of slots so formed as to be spaced apart along an inner circumference surface of the stator core; a plurality of wedges that extend in the axial direction and are inserted into opening portions of the slots in the axial direction and arranged side by side so that the stator coils latch into the slots to remain therein; and a plurality of inner spacers that appear, every time a plurality of layers of the electromagnetic steel plates of the stator core are stacked, so as to be sandwiched between the electromagnetic steel plates, extend radially, and are so arranged as to be spaced apart in a circumferential direction so that ventilation ducts through which cooling gas flows are formed, wherein shoulder portions of the wedges are partially cut to form notches in such a way that the circumferential-direction width of the wedge shoulder portions of at least two wedges that are adjacent to each other in the axial direction, among a plurality of the wedges, at locations corresponding to the ventilation ducts is substantially equal to width of the slots.

According to another embodiment, there is provided a rotating electric machine that has said stator.

The following describes a stator of a rotating electric machine according to embodiments of the present invention with reference to the accompanying drawings.

[First Embodiment]

A first embodiment of the present invention will be described with reference to FIGS. 1 to 3.

Figure 1:
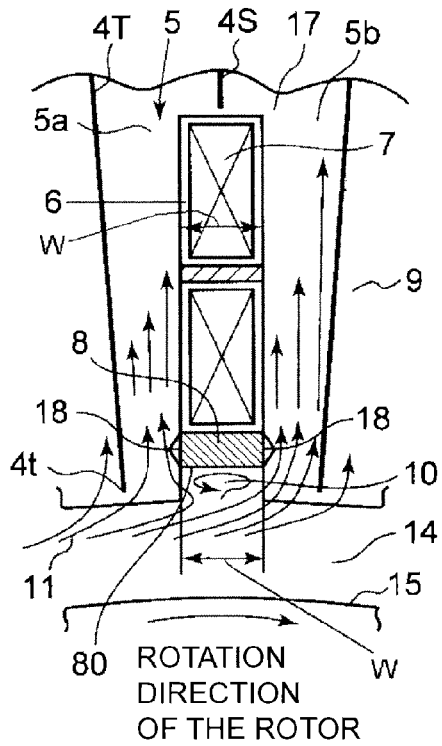
FIG. 1 is a partial transverse cross-sectional view showing the configuration of a one-slot portion of a stator of a rotating electric machine according to a first embodiment of the present invention.

FIG. 1 is a partial transverse cross-sectional view showing an enlarged one-slot portion of a stator core of the stator of the rotating electric machine according to the first embodiment of the present invention. FIG. 2 is a perspective view showing a wedge of the stator of the rotating electric machine that has been taken out according to the first embodiment. FIG. 3 is a partial enlarged perspective view of the wedge shown in FIG. 2.

Figure 2:
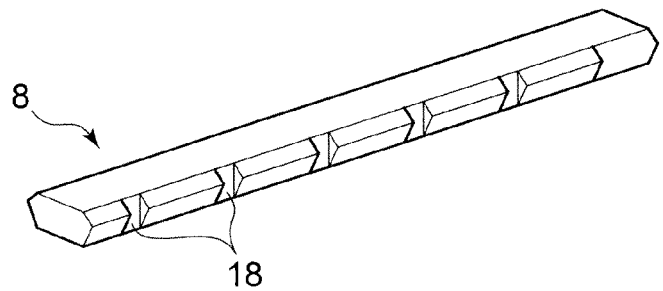
FIG. 2 is a perspective view showing a wedge of the stator of the rotating electric machine that has been taken out according to the first embodiment of the present invention.
Figure 3:
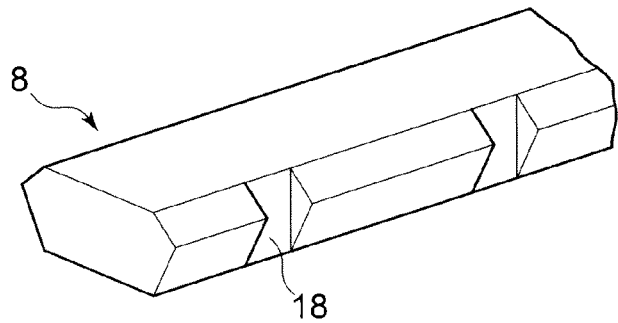
FIG. 3 is a partial enlarged perspective view of the wedge shown in FIG. 2.

As shown in FIGS. 1 to 3, notch portions 18 are provided on wedge shoulder portions 16 in such a way that the width of the wedges 8 at axial-direction positions that correspond to at least ventilation ducts 5a and 5b is substantially equal to a side face of a slot 6. Moreover, according to the present embodiment, the notch portions 18 of the same shape are provided for all the wedge shoulder portions 16 of the stator of the rotating electric machine. The basic configuration except the above is substantially the same as the conventional configuration and therefore will not be described here.

According to the present embodiment, the stator includes a cylindrical stator core 1, which is made up of electromagnetic steel plates 2 that are stacked; and stator coils 7, which are inserted into slots 6 that are provided at an inner side of the stator core 1. The stator coils 7 latch into the slots 6, held by wedges 8 from the inner side of the stator core 1. At the inner side of the stator core 1, a rotor 15 is concentrically disposed through a gas gap 14 and able to rotate.

In the stator core 1, every time a predetermined number of electromagnetic steel plates 2, which make up the stator core 1, are stacked, a ventilation duct 5 is formed for allowing cooling gas 11 to flow along the radial direction of the stator core. The ventilation ducts 5 open to the gas gap 14.

The perimeter of the ventilation duct 5 is made up of at least one or more first inner spacers 4T, which are inserted between the electromagnetic steel plates 2 and arranged so as to face both side faces of the stator coils 7 along the circumferential direction of the stator core 1; a second inner spacer 4S, which is inserted at an outer side position of the stator coils 7; and the electromagnetic steel plates 2, which are so disposed as to be mutually spaced apart by the inner spacers 4T and 4S.

The stator coils 7 latch and are held by the wedges 8 from the inner side of the stator core 1. Each of the wedges 8 has a wider shoulder portion that is wider than the width of the slot 6 except portions of the ventilation duct 5. Each of the wedges is inserted along a groove that is provided on a core tooth portion 9 in an axial direction.

According to the present embodiment, the notch portions 18 are provided on the wedge shoulder portion 16 so that the width of the wedge 8 at an axial-direction position corresponding to the ventilation duct 5 is substantially equal to the width w of the slot 6. That is, the wedge 8 does not project into the ventilation ducts 5. The wedge 8 does not narrow flow-path areas of the ventilation ducts.

However, if there is no problem in terms of strength, the notch portions 18 may be provided in such a way that the notch portions 18 are longer than the axial-direction width of the ventilation duct 5.

According to the above configuration of the present embodiment, the wedge shoulder portions 16 of all the wedges 8 do not project into the ventilation ducts 5 at any locations. Therefore, the flow-path area does not change abruptly as cooling gas 11 passes through the ventilation duct 5. Thus, it is possible to curb an increase in ventilation resistance.

At an inlet portion of the ventilation duct of an exhaust section 13, the wedge shoulder portions 16 do not project into the ventilation ducts 5, and the flow stagnation is suppressed. Therefore, the ventilation resistance decreases.

What is explained in FIG. 1 is an example of the flow of the cooling gas 11 in the exhaust section 13. However, even for the flow of the cooling gas in an inlet section, when the cooling gas 11 is discharged into the gas gap 14 after flowing through the ventilation duct 5, a ventilation area does not become smaller abruptly as in the case of the exhaust section 13. Thus, a ventilation loss decreases.

If it is possible to reduce the ventilation loss when the cooling gas 11 passes through the ventilation duct 5, it is also possible to reduce the windage loss required for driving fans to drive the cooling gas, improving the efficiency of the rotating electric machine. Moreover, it becomes possible to send a larger amount of cooling gas 11, leading to an improvement in the cooling performances of the stator coils 7, the stator core 1, rotor coils and the like. Therefore, it is possible to increase the output power of the rotating electric machine as well as to make the rotating electric machine smaller.

[Second Embodiment]

Figure 5:
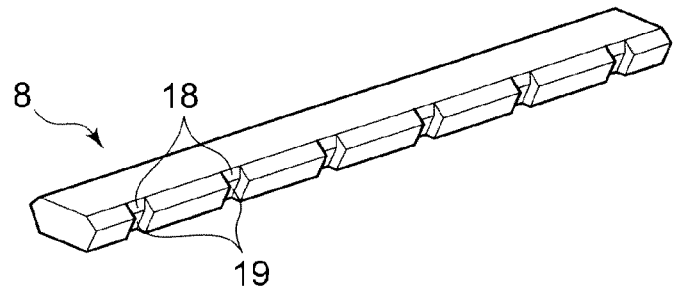
FIG. 5 is a perspective view showing a wedge of the stator of the rotating electric machine that has been taken out according to the second embodiment of the present invention.
Figure 6:
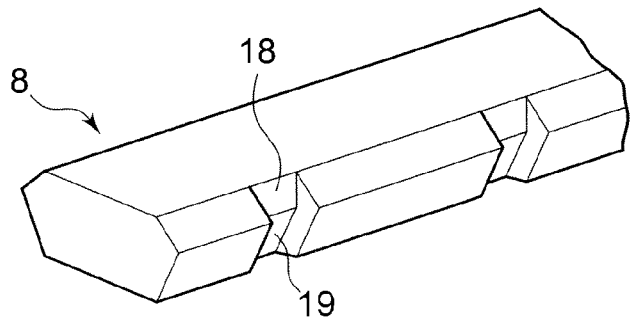
FIG. 6 is a partial enlarged perspective view of the wedge shown in FIG. 5.

A second embodiment of the present invention will be described with reference to FIGS. 4 to 6.

Figure 4:
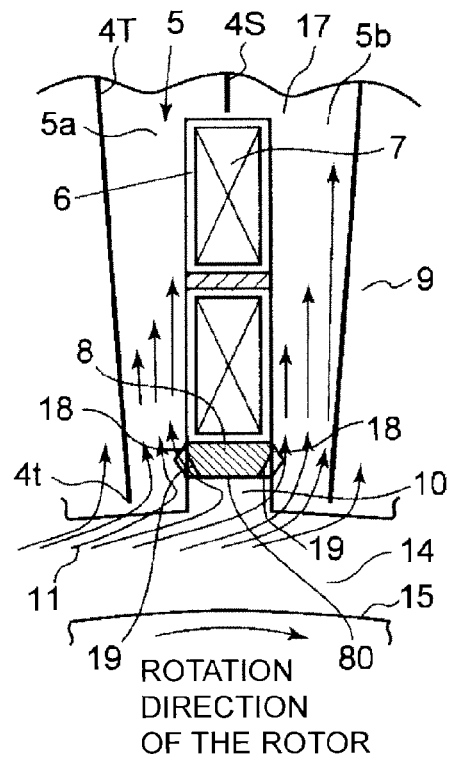
FIG. 4 is a partial transverse cross-sectional view showing the configuration of a one-slot portion of a stator of a rotating electric machine according to a second embodiment of the present invention.

FIG. 4 is a partial transverse cross-sectional view showing an enlarged one-slot portion of a stator core of a stator of a rotating electric machine according to the second embodiment of the present invention. FIG. 5 is a perspective view showing a wedge of the stator of the rotating electric machine that has been taken out according to the second embodiment. FIG. 6 is a partial enlarged perspective view of the wedge shown in FIG. 4.

According to the present embodiment, as in the case of the first embodiment, notch portions 18 are provided on wedge shoulder portions 16 in such a way that the width of the wedges 8 at axial-direction positions that correspond to at least ventilation ducts 5 is substantially equal to the width of a slot 6. Moreover, according to the present embodiment, chamfered portions 19 are also provided at corner portions of wedge inner circumference surfaces 80 at locations where the notches 18 are provided on the shoulder portions 16 of the wedge 8. The basic configuration except the above is substantially the same as that of the first embodiment and therefore will not be described.

According to the present embodiment, the chamfered portions 19 are provided at the corner portions of the wedge inner circumference surfaces 80 so as to correspond to the notch portions 18 provided on the wedge shoulder portion 16. As shown in FIG. 4, cooling gas 11 flowing in a circumferential direction in a gas gap 14 needs to change direction abruptly at an inlet portion of the ventilation duct 5 so as to travel in the radial direction. Moreover, ventilation areas become smaller abruptly.

According to the present embodiment, an opening area for the gas gap 14 of all the ventilation ducts 5a and 5b adjacent to stator coils 7 becomes larger, thereby mitigating changes in the ventilation area. Moreover, in the ventilation duct 5b that is positioned at a rotation direction leading side, the cooling gas 11 flows in along the wedge inner circumference chamfered portion 19, enabling the ventilation resistance of the ventilation duct 5 to be reduced.

The cooling gas 11 that cannot flow into the ventilation duct 5b positioned at the rotation direction leading side ends up being stuck in a wedge lower opening portion 10. However, according to the present embodiment, since the chamfered portions 19 of the wedge's inner circumference surface are provided, the opening area of the ventilation duct 5a positioned at a rotation direction delaying side becomes larger, making it easier for the cooling gas 11 to flow into the ventilation duct 5a along the chamfered portions 19 of the wedge's inner circumference surface. Therefore, the ventilation resistance of the ventilation duct 5 decreases, and it is also possible to mitigate the unbalance in the amount of cooling gas 11 flowing in the ventilation ducts 5a and 5b. Therefore, it is possible to obtain uniform cooling capabilities. The above has described the exhaust section 13 of the embodiment. However, similar advantageous effects can be obtained for an inlet section.

Figure 7:
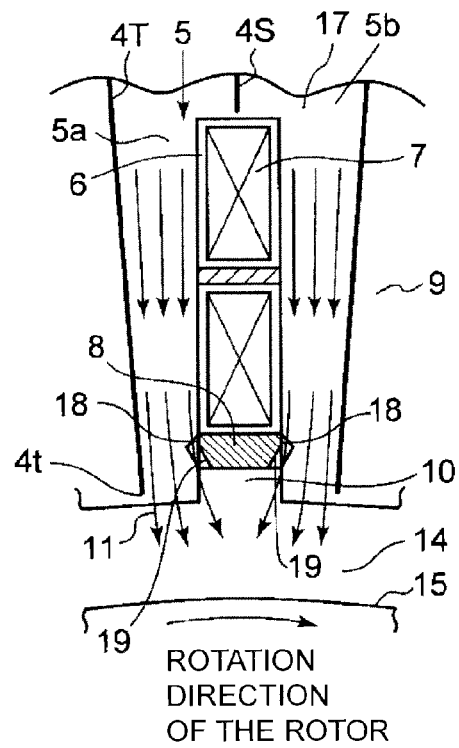
FIG. 7 is a partial transverse cross-sectional view illustrating the situation where cooling gas flows in an inlet section core duct of the stator of the rotating electric machine according to the present invention.

FIG. 7 is a partial transverse cross-sectional view showing the configuration of an inlet section 12 around the wedge 8 according to the present embodiment. With reference to FIG. 7, the situation will be described where the cooling gas 11 flows in the gas gap 14 and the ventilation duct 5.

In the inlet section 12, when the cooling gas 11 is discharged into the gas gap 14, the ventilation area becomes larger abruptly, resulting in a huge outlet loss. However, according to the present embodiment, the chamfered portions 19 are provided at the inner side corner portions of the wedge 8, thereby mitigating an abrupt expansion of the ventilation area. Moreover, the discharging velocity decreases. Therefore, it is possible to reduce the ventilation loss of the ventilation duct 5.

The other operations and advantageous effects are the same as those of the above-described first embodiment.

[Third Embodiment]

A third embodiment of the present invention will be described with reference to FIGS. 8 and 9.

Figure 8:
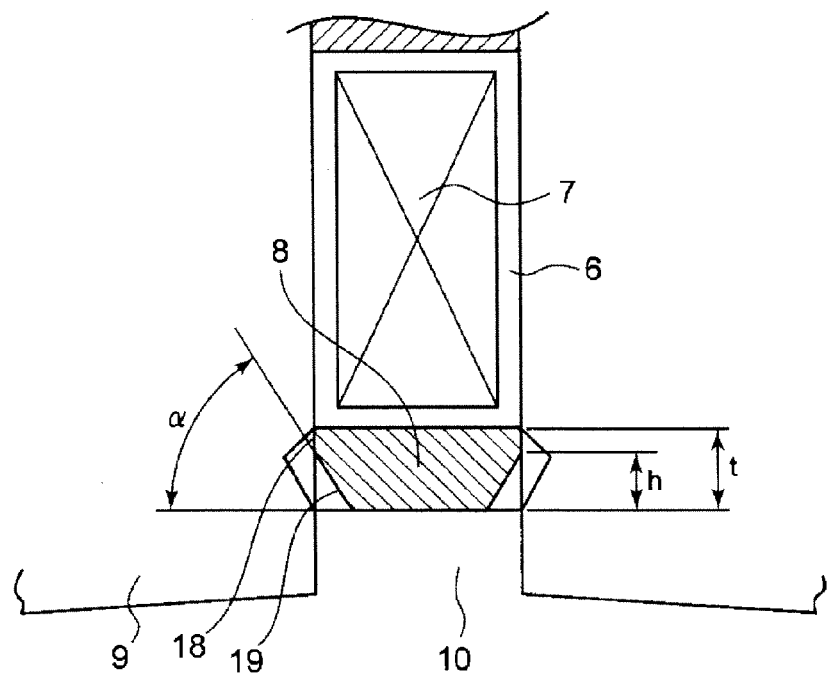
FIG. 8 is a schematic partial transverse cross-sectional view illustrating the shape of a wedge of a stator of a rotating electric machine according to a third embodiment of the present invention.

FIG. 8 is a partial transverse cross-sectional view showing the situation where a stator coil 7 and a wedge 8 are inserted into one slot portion of a stator core 1. FIG. 9 is a characteristic chart showing an example of the relationship between ventilation loss coefficients of a ventilation duct 5a in an exhaust section 13, which are calculated from results of three-dimensional numerical fluid analysis, and chamfer angles $\alpha$ according to the configuration shown in FIG. 8.

The chamfer angles $\alpha$ of chamfered portions 19, which are formed on corner portions of the inner circumference surface of the wedge 8, with respect to the stator core inner side face of the wedge 8 are defined as shown in FIG. 8. According to the present embodiment, the chamfered portion 19 is formed so that $45$ degrees $\leq \alpha \leq 80$ degrees, wherein $\alpha$ is the angle between a wedge inner circumference surface and a corner portion of the wedge inner circumference surface at a portion corresponding to a notch portion 18 provided in an inner circumference surface corner portion of the wedge 8.

If the chamfer angle α is large (for example, α>80 degrees), the expansion ratio of an inlet area of the ventilation duct 5 associated with the chamfer is small. Therefore, a sufficient ventilation loss coefficient reducing effect cannot be obtained due to flow separation or the occurrence of eddies at the corner portion. On the other hand, if the chamfer angle α is small (for example, α<45 degrees), a sufficient flow's turning effect cannot be obtained with respect to the flow of cooling gas 11 having a circumferential direction velocity in a gas gap 14. Therefore, a sufficient ventilation loss coefficient reducing effect cannot be obtained due to flow separation or the occurrence of eddies at the corner portion.

According to the present embodiment, the wedge 8 is chamfered so that 45 degrees≤α≤80 degrees for the chamfer angle α of the wedge 8. Therefore, it is possible to obtain both an inlet area expanding effect of the ventilation duct 5 and the flow's turning effect at the same time. Thus, it is possible to obtain a large ventilation loss reducing effect of the ventilation ducts 5.

Figure 9:
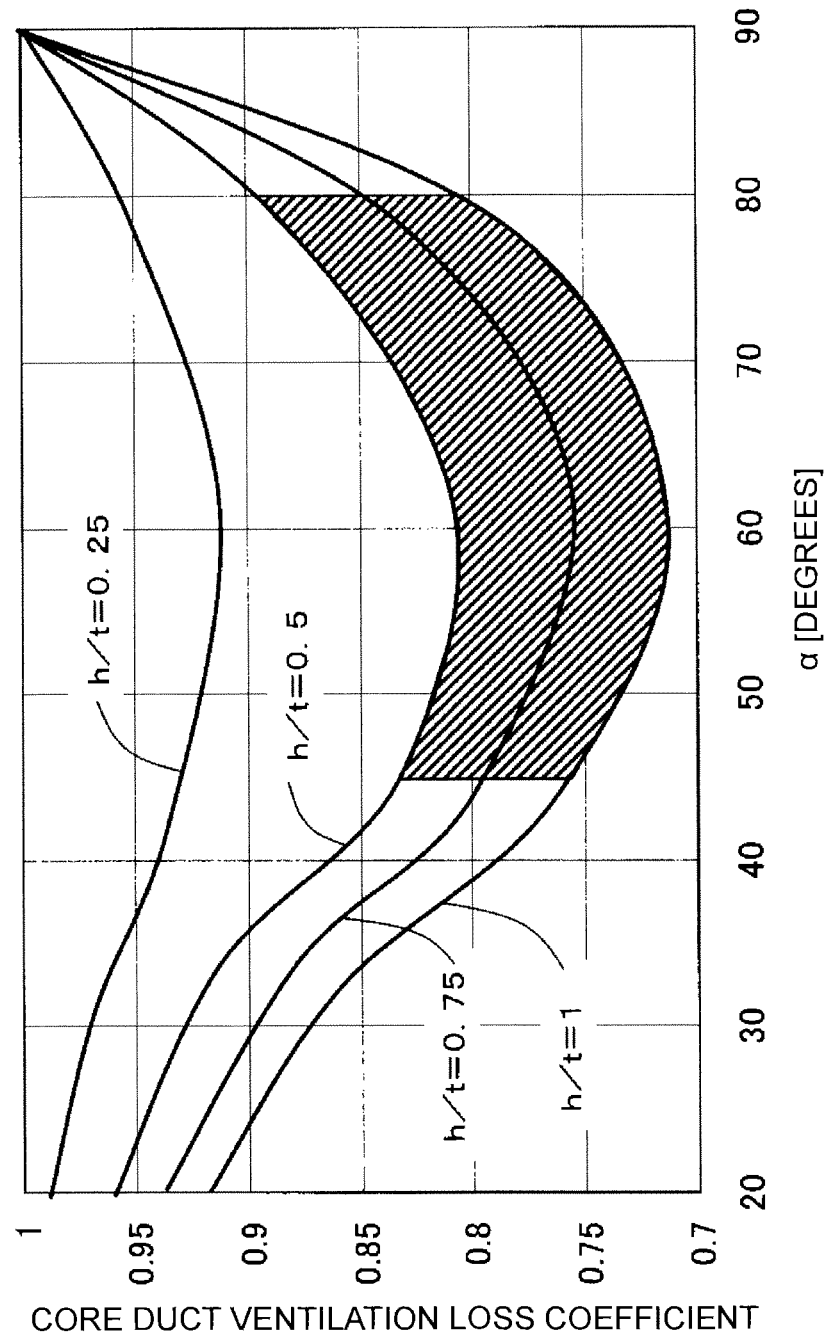
FIG. 9 is a characteristic chart showing the relationship between core duct ventilation loss coefficients and chamfer angles α of a chamfered portion of a wedge in an exhaust section core duct.

In the analysis example shown in FIG. 9, a large ventilation loss reducing effect is obtained even when 30 degrees≤α<45 degrees. However, as the chamfer angle α decreases, a range in which the thickness of the wedge becomes smaller expands, resulting in the need for making the wedge thicker because of the decreased strength of a wedge material. Therefore, the lower limit value of the chamfer angle α is set at 45 degrees.

[Fourth Embodiment]

A fourth embodiment of the present invention will be described with reference to FIGS. 8 and 10.

According to the present embodiment, the configuration shown in FIG. 8 is applied to an inlet section. In FIG. 8, the chamfered portion is formed so that the chamfer angle α of the chamfered portion 19 provided at the inner circumference surface corner portion of the wedge 8 is as follows: 60 degrees≤α≤85 degrees.

Figure 10:
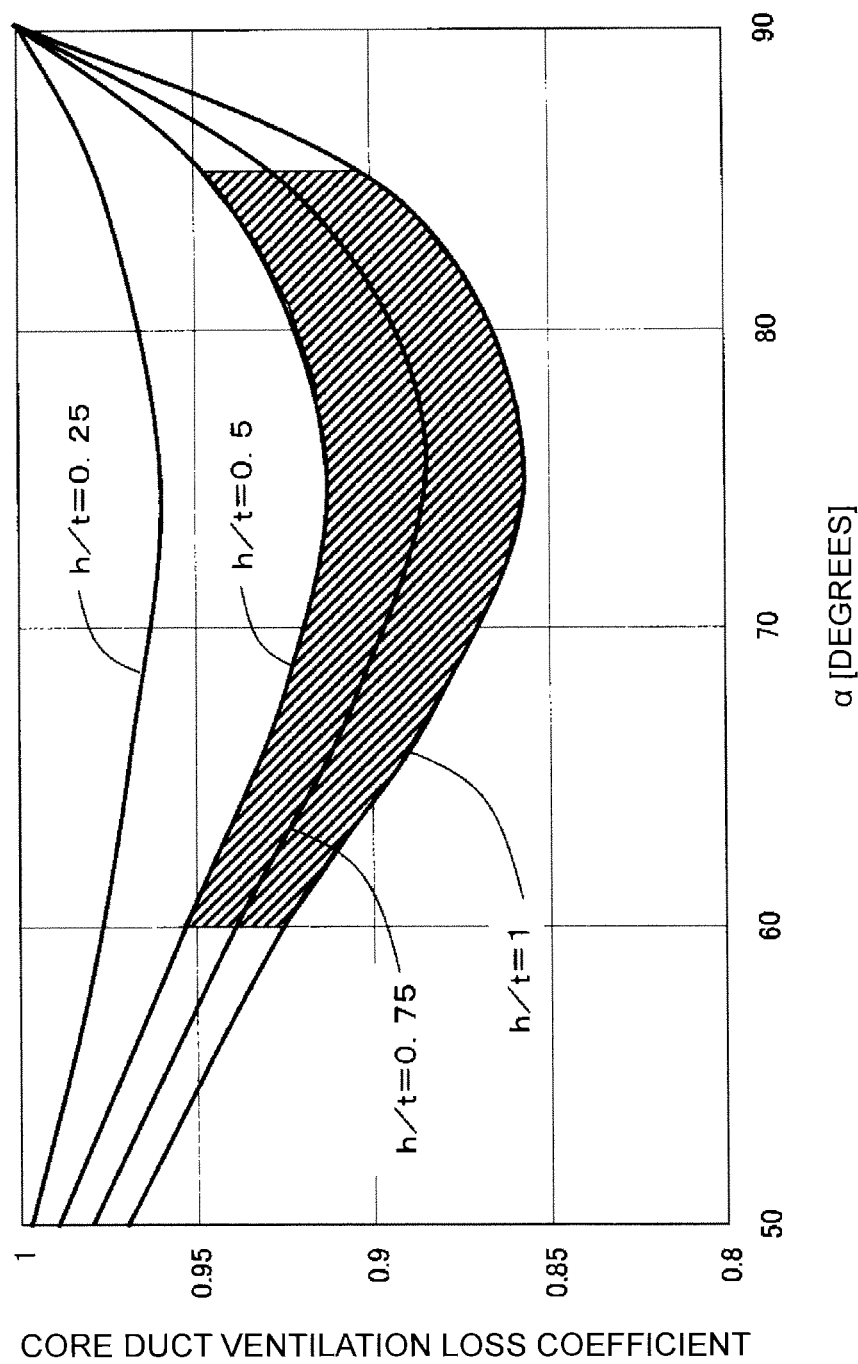
FIG. 10 is a characteristic chart showing the relationship between core duct ventilation loss coefficients and chamfer angles α of a chamfered portion of a wedge in an inlet section core duct.

FIG. 10 shows an example of the relationship between ventilation loss coefficients of a ventilation duct 5a in an inlet section 12, which are results of three-dimensional numerical fluid analysis, and chamfer angles α.

In the inlet section 12, as cooling gas 11 is discharged along the chamfered portion 19 formed on the inner circumference surface corner portion of the wedge 8, an abrupt expansion of the ventilation area is mitigated. Moreover, the discharge velocity decreases. Therefore, it is possible to reduce the ventilation loss of the ventilation ducts 5.

However, if the chamfer angle α is large (for example, α>85 degrees), the expansion ratio of an inlet area of the ventilation duct 5 associated with the chamfer is small. Therefore, when the cooling gas flows into the gas gap from the ventilation duct, the flow does not expand at the corner portion and jets out into the gas gap at high speed, running against a flow in the gas gap and resulting in a large loss. If the chamfer angle α is small (for example, α<60 degrees), a sufficient flow's decelerating effect cannot be obtained because of the flow separation of the flow from the chamfered portion 19 formed on the wedge inner circumference surface corner portion. Thus, it is impossible to obtain a sufficient ventilation loss coefficient reducing effect.

According to the present embodiment, the chamfered portion is formed so that 60 degrees≤α≤85 degrees for the chamfer angle α formed on the wedge 8. Therefore, it is possible to obtain a high level ventilation loss reducing effect of the ventilation duct 5 because of the expanded outlet area of the ventilation duct 5.

[Fifth Embodiment]

A fifth embodiment of the present invention will be described with reference to FIGS. 9 and 10.

According to the present embodiment, the basic configuration of the wedges is the same as those of the above-described embodiments. However, according to the present embodiment, the chamfered portion is so formed that the chamfer depth h of the chamfered portion 19 provided on an inner circumference surface corner portion of the wedge 8 is 50% or more of the thickness t of the wedge.

A plurality of curved lines shown in FIG. 9 represents an example of the results of three-dimensional numerical fluid analysis associated with an exhaust section 13. In this case, when the wedge thickness is t and the chamfer depth is h, t/h serves as a parameter. FIG. 10 shows characteristics in the case where the same configuration is applied to the inlet section.

As described in the third and fourth embodiments, a ventilation resistance reducing effect by the chamfered portion 19 of the wedge 8 is dependent on a change rate of the ventilation area of the ventilation duct 5 by the chamfered portion 19 of the wedge. However, if the chamfer depth h is small, sufficient change rate of the area cannot be obtained, leading to a reduction in the ventilation resistance reducing effect.

According to the present embodiment, the chamfer depth h of the chamfered portion 19 provided on the wedge 8 is 50% or more (0.5≤h/t) of the wedge thickness t (0.5≤h/t). Therefore, it is possible to obtain a more improved ventilation resistance reducing effect.

[Sixth Embodiment]

Figure 11:
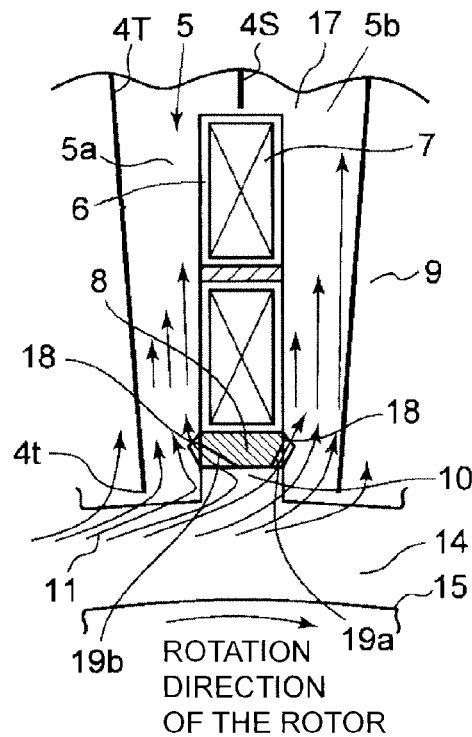
FIG. 11 is a partial transverse cross-sectional view showing the configuration of a one-slot portion of a stator of a rotating electric machine according to a sixth embodiment of the present invention.

A sixth embodiment of the present invention will be described with reference to FIG. 11.

According to the present embodiment, in a ventilation duct 5 positioned at least in an exhaust section 13 of a stator, the angle α of a chamfered portion 19b of a rotor's rotation direction delaying side of a wedge 8 at a portion corresponding to a chamfered portion 19 formed on an inner circumference surface corner portion of the wedge 8 relative to a stator core inner side face 80 of the wedge 8 is as follows: 30 degrees≤α. Moreover, the chamfered portion 19b of the wedge 8 is so formed that the depth h of the chamfered portion of the wedge 8 is 50% or more of the thickness t of the wedge 8.

As described as the second embodiment, the cooling gas 11 that cannot flow into a ventilation duct 5b positioned at a rotation direction leading stagnates in a wedge lower opening portion 10. Since the chamfered portions 19 of the wedge 8 are provided, the opening area of a ventilation duct 5a positioned at a rotation direction delaying side becomes larger, making it easier for the cooling gas 11 to flow into the ventilation duct 5a along the chamfered portions 19 of the wedge 8. Therefore, the ventilation resistance of the ventilation duct 5 decreases, and it is also possible to mitigate the unbalance in the amount of the cooling gas 11 flowing in the ventilation ducts 5a and 5b. Therefore, it is possible to obtain uniform cooling capabilities.

At this time, as for the ventilation duct 5a positioned at the rotation direction delaying side, the ventilation loss reducing effect obtained by the turning of the flow of the cooling gas 11 is smaller than that of the ventilation duct 5b positioned at the rotation direction leading side. Therefore, a wider range of the chamfer angle α is allowed to obtain a high-level loss resistance reducing effect.

Furthermore, according to the present embodiment, even as for the opening area of the ventilation duct 5a positioned at the rotation direction delaying side, the chamfered portion 19 of the wedge 8 is so formed that 30 degrees≤α for the chamfer angle α of the chamfered portion 19 of the wedge 8, and that the depth h of the chamfered portion of the wedge 8 is 50% or more of the thickness t of the wedge 8. Therefore, the ventilation duct opening area of the ventilation duct 5a increases, making it easier for the cooling gas 11 to flow in. Thus, it is possible to obtain a large ventilation loss reducing effect as well as to obtain uniform cooling capabilities by mitigating the unbalance in the flow rate of the cooling gas 11 flowing in the ventilation ducts 5a and 5b.

[Seventh Embodiment]

Figure 12:
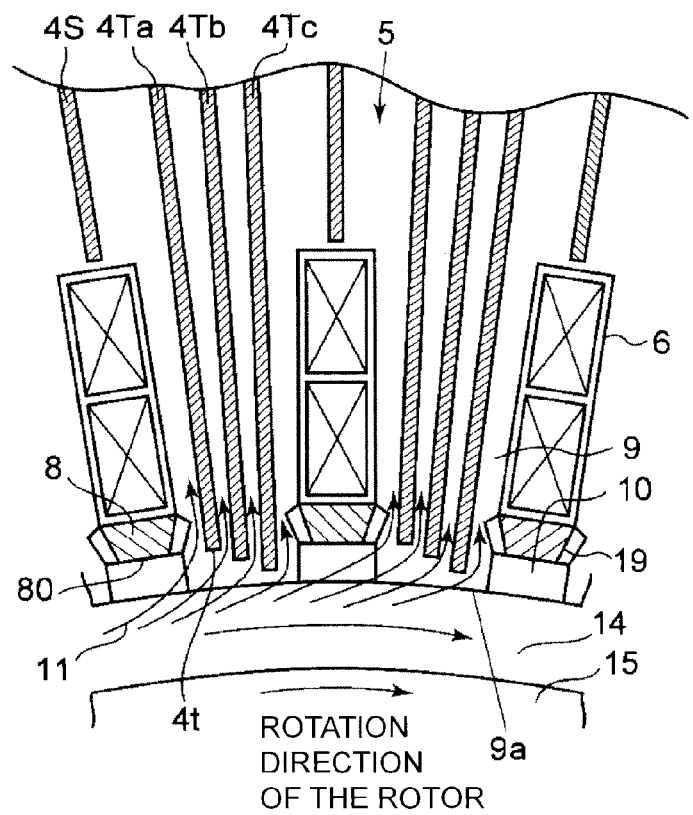
FIG. 12 is a partial transverse cross-sectional view showing the configuration of inner spacers of a stator of a rotating electric machine according to a seventh embodiment of the present invention.

A seventh embodiment of the present invention will be described with reference to FIG. 12.

The present embodiment relates to the configuration of ventilation ducts in the case where ventilation ducts 5 are formed by disposing a plurality (three in the case of FIG. 12) of first inner spacers 4Ta, 4Tb and 4Tc in a tooth portion 9 of a stator core and cooling gas 11 flows from an inner side of a stator to an outer side.

According to the present embodiment, out of the first inner spacers 4T disposed on the tooth portion 9 of the stator core, the radial-direction position of the stator core inner side tip 4t of the first inner spacer 4Ta that is positioned closest to the rotation direction delaying side is substantially the same as that of an inner circumference surface 80 of the wedge 8. Out of the first inner spacers 4T disposed side by side on the tooth portion 9, the stator core inner side tip 4t of the first inner spacer 4Tc positioned at the rotation direction leading side is placed so as to project more into the inside than the stator core inner side tip of the delaying-side first inner spacer 4Tb.

The stator core inner circumference surface 80 of the wedge 8 is so formed as to be set back from a tooth portion inner circumference surface 9a of the stator core toward the stator core outer side. In a stator core inner side opening portion of the ventilation duct 5, the stator core inner side tip 4t of the first inner spacer 4T is so formed as to project more toward the inside of the stator core 1 than the stator core inner circumference surface 80 of the wedge 8.

In an exhaust section 13 in which cooling gas 11 flows from the inner side of the stator having the above configuration to the outer side, the cooling gas 11 flowing in a gas gap 14 in a circumferential direction needs to abruptly change direction at an inlet portion of the ventilation duct 5 so as to travel in the radial outer direction.

According to the present embodiment, towards the rotation direction, the inner side end portions 4t of the first inner spacers 4Ta, 4Tb and 4Tc are placed radially inner side of the stator core. Therefore, it is possible for the cooling gas 11 flowing in the circumferential direction to make a turn to the outward radial direction in an efficient manner. Thus, it is possible to reduce the ventilation resistance of the ventilation duct 5.

The circumferential-direction positions of the radial inner side tips 4t of the first inner spacers 4Ta, 4Tb and 4Tc disposed on the tooth portion 9 are mutually spaced apart evenly. In addition, the difference of the radial-direction positions of the inner side tips 4t of projecting portions of the adjoining inner spacers of the first inner spacers 4Ta, 4Tb and 4Tc are the same. Therefore, it is possible to keep the inlet opening areas of the ventilation ducts 5 substantially uniform. Therefore, it is possible to obtain uniform cooling capabilities by mitigating the unbalance in the amount of the flowing cooling gas 11 between the ventilation ducts 5, which are divided by a plurality of the first inner spacers 4Ta, 4Tb and 4Tc.

[Eighth Embodiment]

Figure 13:
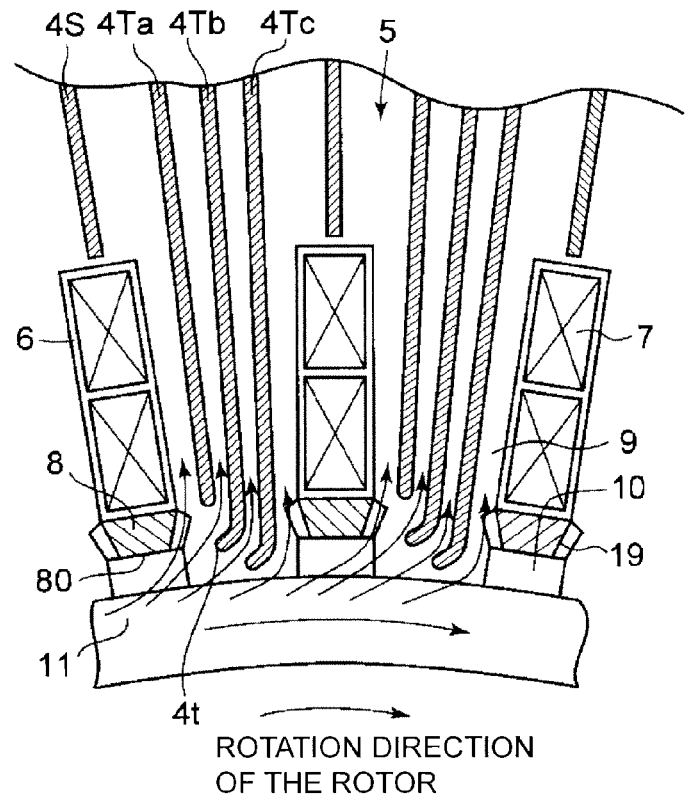
FIG. 13 is a partial transverse cross-sectional view showing the configuration of inner spacers of a stator of a rotating electric machine according to an eighth embodiment of the present invention.
Figure 14:
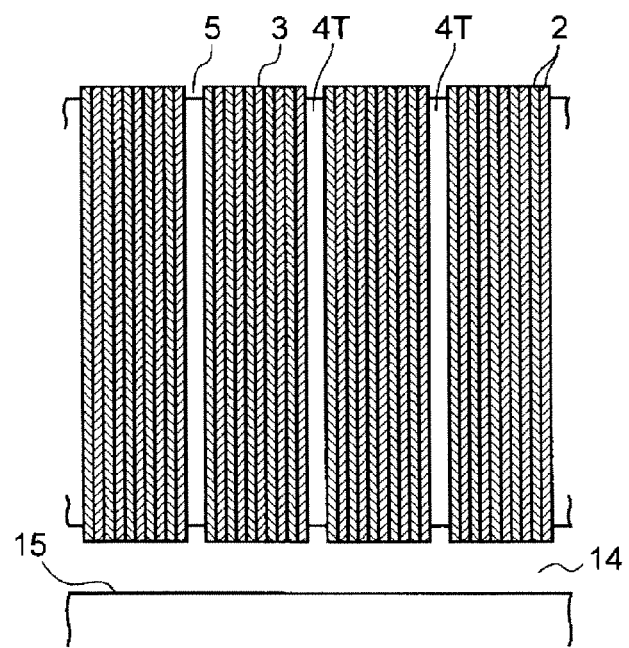
FIG. 14 is a longitudinal cross-sectional view of an upper half portion, showing the configuration of ventilation ducts and a stacked core of a stator of a conventional rotating electric machine.
Figure 15:
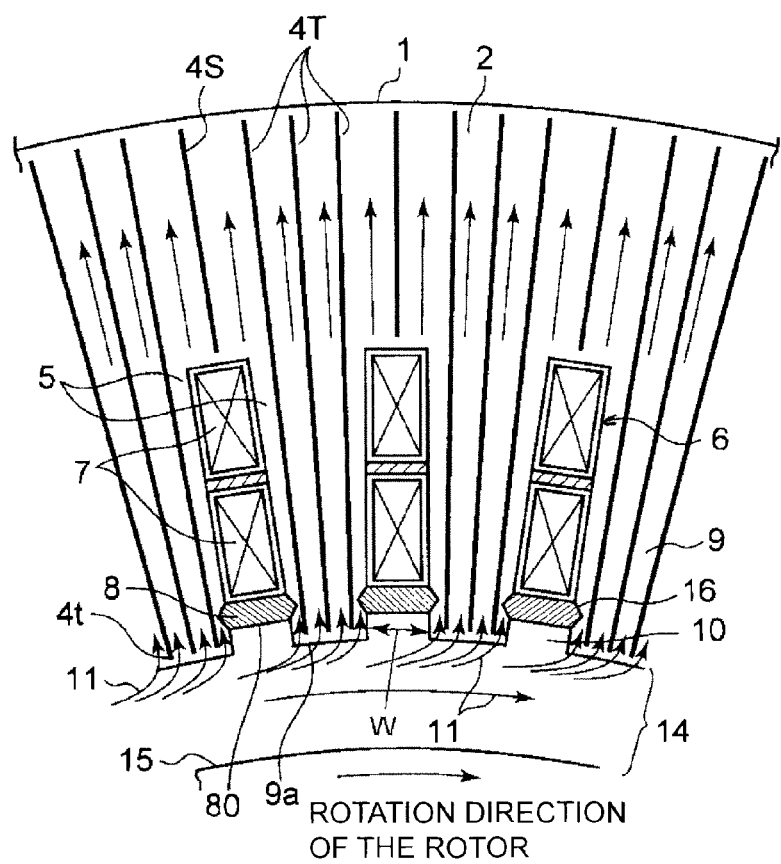
FIG. 15 is a partial transverse cross-sectional view showing the configuration of stator iron of a conventional rotating electric machine.
Figure 16:
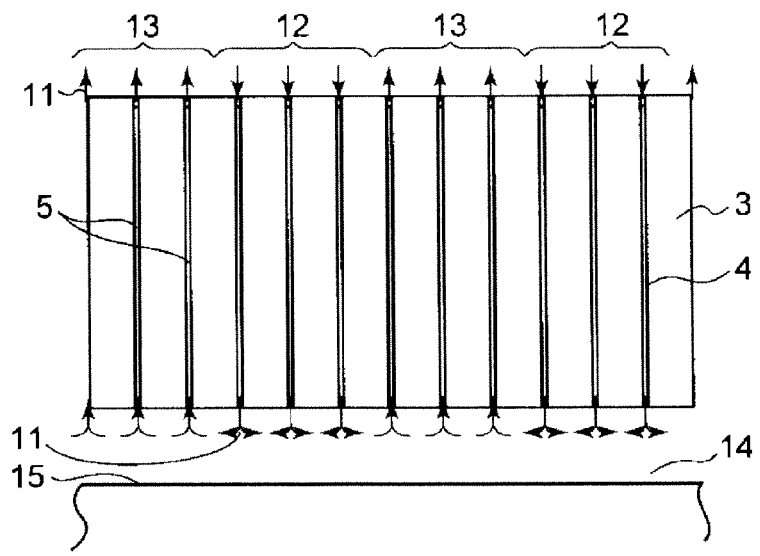
FIG. 16 is longitudinal cross-sectional view of an upper half portion, showing a stator core of a conventional rotating electric machine.
Figure 17:
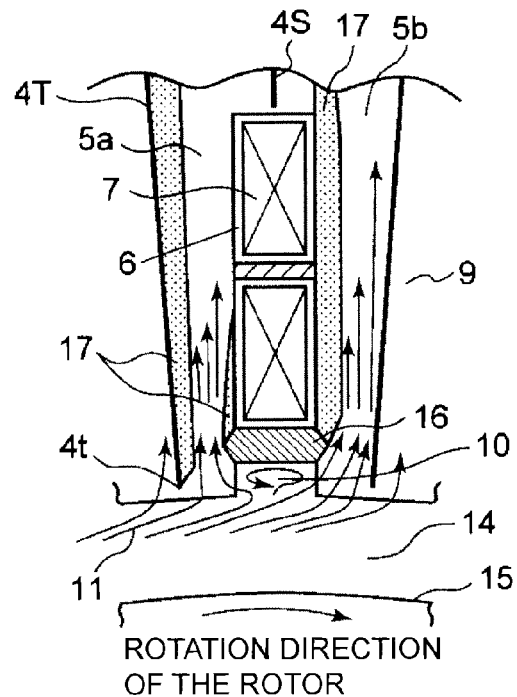
FIG. 17 is a schematic partial transverse cross-sectional view of an area around a stator core duct, illustrating the situation where cooling gas flows in a conventional exhaust section stator core duct.
Figure 18:
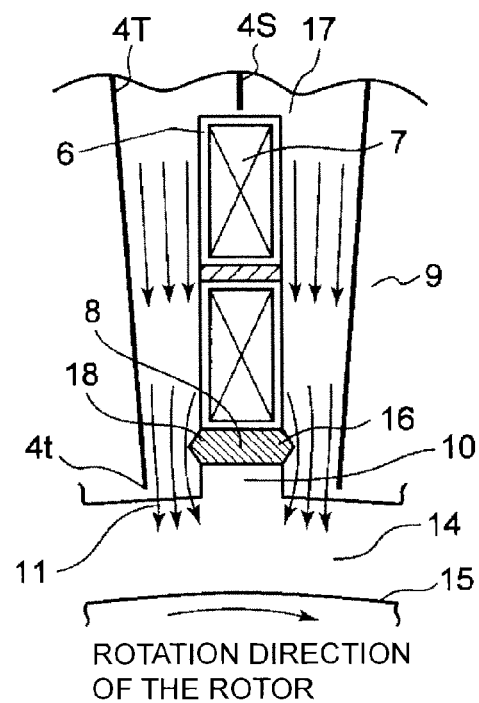
FIG. 18 is a schematic partial transverse cross-sectional view of an area around a stator core duct, illustrating the situation where cooling gas flows in a conventional inlet section stator core duct.
Figure 19:
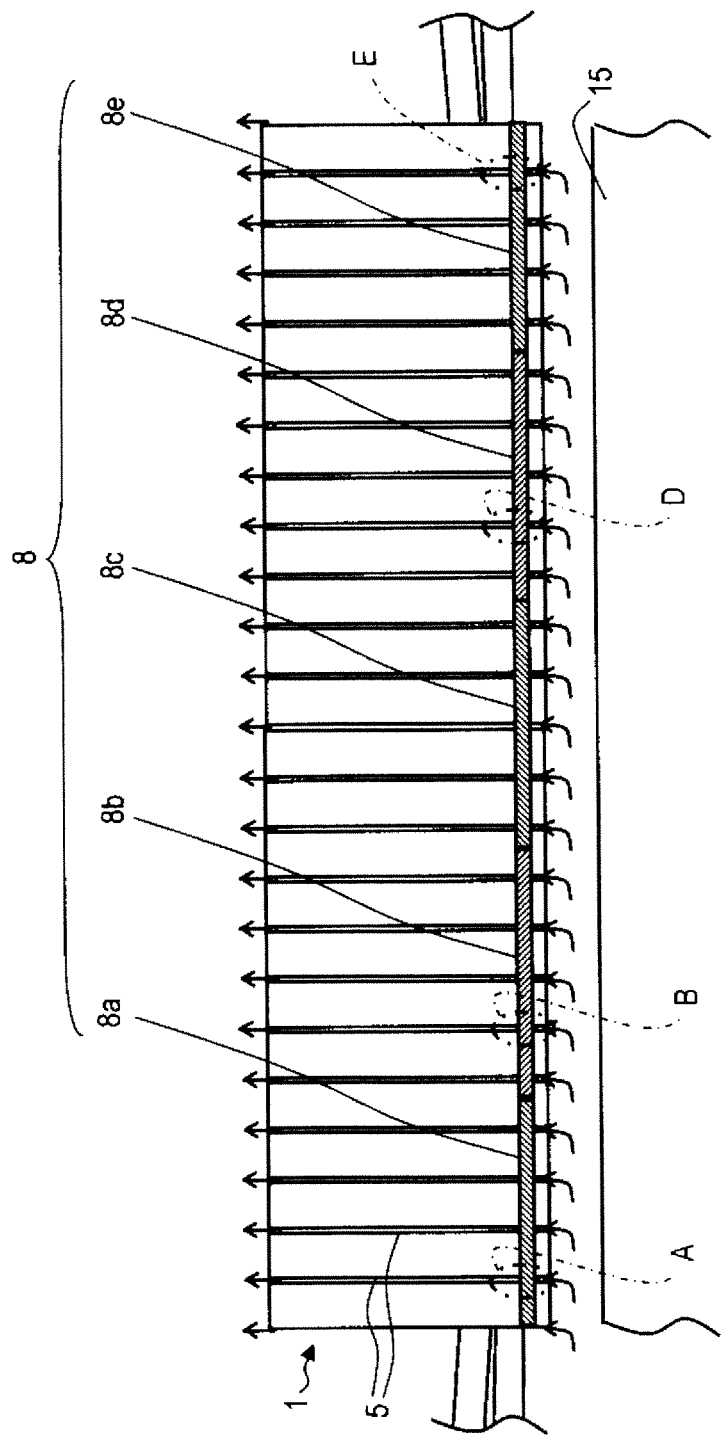
FIG. 19 is a longitudinal cross-sectional view of an upper half portion around a stator core of a rotating electric machine according to a conventional technique.

An eighth embodiment of the present invention will be described with reference to FIG. 13.

The present embodiment relates to the configuration of ventilation ducts in the case where ventilation ducts 5 are formed by disposing a plurality of first inner spacers 4Ta, 4Tb and 4Tc in a tooth portion 9 of a stator core 1 and cooling gas 11 flows from an inner side of a stator to an outer side.

According to the present embodiment, stator core inner side end portions of the first inner spacers 4T disposed on the tooth portion 9 of the stator core 1 are bent to a rotation direction delaying side to form the ventilation ducts 5.

Since the inner side tips of the first inner spacers 4T are bent toward the rotation direction delaying side, it is possible for the cooling gas 11 flowing in a circumferential direction to make a turn in an efficient manner so as to travel in the radial direction, resulting in a reduction in the ventilation resistance of the ventilation ducts 5.

According to the present embodiment, among the first inner spacers 4T disposed on the tooth portion 9 of the stator core 1, the stator core inner side end portion of the first inner spacer 4Ta positioned most to the rotation direction delaying side is not bent. The radial position of the stator core inner side tip 4t is placed moer to the outer side than a stator core inner circumference surface of a wedge 8 is. Furthermore, among the first inner spacers 4T arranged side by side on the tooth portion 9, the stator core inner side tip of the first inner spacer 4Tc at the rotation direction leading side is disposed so as to project more into the inside than the stator core inner side tip of the delaying-side first inner spacer 4Tb, thereby forming the ventilation ducts.

According to the present embodiment, the stator core inner side end portions of the first inner spacers 4T are bent toward the rotation direction delaying side. However, as for the stator core inner side end portion of the first inner spacer 4T positioned most to the rotation direction delaying side, if a tip portion is bent, the inlet opening areas of the ventilation ducts 5 formed by stator coils 7 and wedges 8 become narrower, possibly leading to a rise in the ventilation resistance.

According to the present embodiment, among the first inner spacers 4T disposed on the tooth portion 9 of the stator core 1, the stator core inner side end portion of the first inner spacer 4Ta positioned most rotation direction delaying side is not bent. Moreover, the radial-direction position of the tip portion 4t thereof is placed more outer side than the stator core inner circumference surface of the wedge 8 is. Therefore, it is possible to have a sufficient inlet opening area. Thus, it is possible to reduce the ventilation resistance of the ventilation ducts 5.

Moreover, the circumferential-direction positions of the stator core inner side tips 4t of the first inner spacers 4Ta, 4Tb and 4Tc disposed on the tooth portion 9 are spaced apart evenly; the radial-direction differences of projecting portions of the tip portions of the adjoining inner spacers are made uniform. Therefore, it is possible to keep the inlet opening areas of the ventilation ducts 5 equal substantially. Therefore, it is possible to obtain uniform cooling capabilities by mitigating the unbalance in the amount of the flowing cooling gas 11 between the ventilation ducts 5, which are divided by a plurality of the first inner spacers 4Ta, 4Tb and 4Tc.

[Other Embodiments]

The above has described various embodiments. The embodiments are given for illustrative purposes only, and the present invention is not limited to the embodiments. For example, it is possible to appropriately combine the features of different embodiments.

According to the above embodiments, the wedge shoulder portions are partially cut so that the circumferential-direction width of the wedge shoulder portions of a plurality of the wedges at locations corresponding to the ventilation ducts is equal to the width of the slots. However, it is not necessary for the wedge shoulder portions to be partially cut for the wedge shoulder portions of all the wedges at locations corresponding to all the ventilation ducts. For example, the advantageous effects of the present invention can be obtained if the wedge shoulder portions are partially cut in such a way that the circumferential-direction width of the wedge shoulder portions of at least two wedges that are adjacent to each other in the axial direction at locations corresponding to the ventilation ducts is substantially equal to the width of the slots.

What is claimed is:

1. A stator of a rotating electric machine, the stator including:
    a cylindrical stator core formed by stacking, in an axial direction, electromagnetic steel plates arranged to surround an outer circumference of a rotor, the cylindrical stator core comprising a plurality of stator core blocks aligned with each other in an axial direction;
    stator coils contained in a plurality of slots that are spaced apart along an inner circumference surface of the stator core;
    a plurality of wedges that extend in the axial direction and are inserted into opening portions of the slots in the axial direction and arranged side by side so that the stator coils latch into the slots to remain therein; and
    a plurality of inner spacers that are positioned between adjacent stator core blocks of the plurality of stator core blocks so as to be sandwiched between the adjacent stator core blocks, extend radially, and are arranged so as to be spaced apart in a circumferential direction such that ventilation ducts through which cooling gas flows are formed, radially, wherein:
    at least two wedges among a plurality of the wedges are adjacent to each other in the axial direction,
    shoulder portions of the at least two wedges are partially cut to form notches such that the circumferential-direction width of the shoulder portions of the at least two wedges in the circumferential direction, on a rotation direction leading side and a rotation direction delaying side of each of the stator coils at locations corresponding to the ventilation ducts, is substantially equal to the width of the slots,
    each of the at least two wedges that are adjacent to each other in the axial direction has a plurality of notches, and
    a chamfered portion is formed at a corner portion of a wedge positioned at an inner side of the stator core.

2. The stator of the rotating electric machine according to claim 1, wherein
    at least a portion of a ventilation duct forms an exhaust section in which the cooling gas that flows along the rotor in a direction of rotation of the rotor is divided so as to flow along both sides of each of the stator coils and flow toward an outer side; and
    an angle α of the chamfered portion provided on a corner portion of a wedge of the exhaust section relative to a side face of the wedge positioned at the inner side of the stator is greater than or equal to 45 degrees and less than or equal to 80 degrees.

3. The stator of the rotating electric machine according to claim 1, wherein
    at least a portion of a ventilation duct forms an inlet section in which the cooling gas introduced from an outer side is divided so as to flow along both sides of each of the stator coils and flow toward the inner side; and
    an angle α of the chamfered portion provided on a corner portion of a wedge of the inlet section relative to a side face of the wedge positioned at the inner side of the stator is greater than or equal to 60 degrees and less than or equal to 85 degrees.

4. The stator of the rotating electric machine according to claim 1, wherein
    a corner portion of an inner circumference surface of a portion of a wedge corresponds to the notches provided on a shoulder portion of the wedge and is chamfered in a range that is 50 percent or more of the thickness of the wedge.

5. The stator of the rotating electric machine according to claim 1, wherein
    at least a portion of a ventilation duct forms an exhaust section in which the cooling gas that flows along the rotor in a direction of rotation of the rotor is divided so as to flow along both sides of each of the stator coils and flow toward an outer side;
    among corner portions of an inner circumference surface of a portion of a wedge of the exhaust section, corresponding to a notch provided on a shoulder portion of the wedge, an angle α of a corner portion at the rotor rotation direction delaying-side relative to the inner circumference surface is greater than or equal to 30 degrees; and
    the corner portion at the rotor rotation direction delaying-side is chamfered in a range that is 50 percent or more of the thickness of the wedge.

6. The stator of the rotating electric machine according to claim 1, wherein
    at least a portion of a ventilation duct forms an exhaust section in which the cooling gas that flows along the rotor in a direction of rotation of the rotor is divided so as to flow along both sides of each of the stator coils and flow toward an outer side;
    in the exhaust section, a plurality of the inner spacers are spaced apart in the circumferential direction on each of a plurality of tooth portions of the core, each tooth portion being sandwiched between the slots;
    among inner spacers placed on the same tooth portion, a radial-direction position of an inner side tip of the inner spacer positioned closest to the rotation direction delaying side is substantially the same as an inner circumference surface of a wedge; and, among the inner spacers placed on the same tooth portion, an inner side tip of the inner spacer positioned at the rotation direction leading side is so disposed as to project more into the inside than the inner side tip of the inner spacer positioned closest to the rotation direction delaying side.

7. The stator of the rotating electric machine according to claim 6, wherein,
    in the exhaust section, there are at least three inner spacers placed on the same tooth portion; and
    radial- and circumferential-direction positions of the inner side tips of the inner spacers are evenly spaced apart.

8. The stator of the rotating electric machine according to claim 1, wherein
    at least a portion of a ventilation duct forms an exhaust section in which the cooling gas that flows along a rotor in a direction of rotation of the rotor is divided so as to flow along both sides of each of the stator coils and flow toward an outer side; and, in the exhaust section, among inner spacers placed on a tooth portion, inner side end portions of at least one or more spacers are bent toward the rotation direction delaying side to form the ventilation duct.

9. The stator of the rotating electric machine according to claim 8, wherein, in the exhaust section, at least two of the inner spacers are placed on the same tooth portion;

among the inner spacers, an inner side end portion of the inner spacer positioned closest to the rotation direction delaying side is not bent;

a radial-direction position of an inner side tip of the inner spacer closest to the rotation direction delaying side is positioned closer to an outer side than a wedge inner circumference surface; and, among other inner spacers placed on the same tooth portion, an inner side tip of the inner spacer positioned at the rotation direction leading side is so disposed as to project more into the inside than the inner side tip of the inner spacer positioned closest to the rotation direction delaying side.

10. The stator of the rotating electric machine according to claim 9, wherein, in the exhaust section, there are at least three inner spacers placed on a same tooth portion; and, among the inner spacers, the radial and circumferential-direction positions of the inner side tips of the inner spacers are evenly spaced apart except for the inner spacer positioned closest to the rotation direction delaying side.

11. The stator of the rotating electric machine according to claim 1, wherein the shoulder portions of the wedges are partially cut so that the circumferential-direction width of the shoulder portions of the wedges at locations corresponding to all of the ventilation ducts is substantially same as the width of the slots.

12. A rotating electric machine, having the stator claimed in claim 1.

13. The stator of the rotating electric machine according to claim 8, wherein a first inner side end portion of a first inner spacer and a second inner side end portion of a second inner spacer are bent at the same angle toward the rotation direction delaying side to form the ventilation duct, and a third inner side end portion of a third inner spacer, which is positioned closest to the rotation direction delaying side, is not bent.

* * * * *